(12) United States Patent
Kang et al.

(10) Patent No.: US 11,442,512 B2
(45) Date of Patent: Sep. 13, 2022

(54) DISPLAY DEVICE

(71) Applicant: LG ELECTRONICS INC., Seoul (KR)

(72) Inventors: Seunggyu Kang, Seoul (KR); Hyuncheol Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/154,704

(22) Filed: Jan. 21, 2021

(65) Prior Publication Data

US 2021/0263570 A1  Aug. 26, 2021

(30) Foreign Application Priority Data

Feb. 21, 2020 (KR) .................... 10-2020-0021702

(51) Int. Cl.
*G06F 1/18* (2006.01)
(52) U.S. Cl.
CPC .................................. *G06F 1/181* (2013.01)
(58) Field of Classification Search
CPC .. G06F 1/181; G06F 1/1601; G02F 1/133308; H01L 27/32; H01L 51/50; G09F 9/33
See application file for complete search history.

(56) References Cited

U.S. PATENT DOCUMENTS

| 9,841,622 B2 * | 12/2017 | Lee | G02F 1/133308 |
| 10,185,081 B2 * | 1/2019 | Kobayashi | H04N 21/4312 |
| 10,718,894 B2 * | 7/2020 | Jeon | G02B 6/0088 |
| 11,106,067 B2 * | 8/2021 | Fujita | G02F 1/133308 |
| 2010/0302457 A1 * | 12/2010 | Yamamoto | G02F 1/133308 349/61 |
| 2012/0327686 A1 * | 12/2012 | Chen | G02F 1/133308 362/611 |
| 2014/0240906 A1 * | 8/2014 | Seo | H04M 1/0268 361/679.01 |

(Continued)

FOREIGN PATENT DOCUMENTS

JP  2002156622  5/2002
JP  2014016562  1/2014
(Continued)

OTHER PUBLICATIONS

PCT International Application No. PCT/KR2020/003016, International Search Report dated Nov. 17, 2020, 3 pages.
(Continued)

*Primary Examiner* — Rockshana D Chowdhury
(74) *Attorney, Agent, or Firm* — Lee Hong Degerman Kang Waimey

(57) ABSTRACT

A display device is disclosed. The display device includes a display panel, a frame positioned behind the display panel, a back cover coupled to the frame so as to cover a rear surface of the frame, and a fixing member, which extends longitudinally and which is disposed between the frame and the back cover and is fixed to the frame, the fixing member having a fixing hole formed in a direction intersecting the longitudinal direction of the fixing member, wherein the back cover has therein a coupling hole at a location facing the fixing hole, and is coupled to the fixing member by means of a fastening member, which is inserted into the fixing hole through the coupling hole.

11 Claims, 16 Drawing Sheets

(56) References Cited

U.S. PATENT DOCUMENTS

2016/0360628 A1* 12/2016 Yu ................... G02B 6/0068
2019/0146263 A1*  5/2019 Kim ................. G02F 1/133308
                                                        361/809
2021/0200034 A1*  7/2021 Nakamichi ....... G02F 1/133607

FOREIGN PATENT DOCUMENTS

| JP | 2019133051 | 8/2019 | | |
|---|---|---|---|---|
| JP | 2020020977 | 2/2020 | | |
| KR | 20180011446 A | * 2/2018 | ....... | G02F 1/133382 |
| KR | 1020180011446 | 2/2018 | | |
| KR | 1020180034302 | 4/2018 | | |
| KR | 10-2019-0048485 | 5/2019 | | |

OTHER PUBLICATIONS

Korean Intellectual Property Office Application No. 10-2020-0021702, Office Action dated Jun. 28, 2021, 4 pages.
Korean Intellectual Property Office Application No. 10-2020-0021702, Notice of Allowance dated Dec. 2, 2021, 2 pages.

* cited by examiner

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2020-0021702, filed on Feb. 21, 2020, the contents of which are hereby incorporated by reference herein in its entirety.

BACKGROUND OF THE INVENTION

1. Field of the Invention

The present disclosure relates to a display device.

2. Description of the Related Art

With the development of the information society, demand for various kinds of display devices is increasing. In response to these needs, various kinds of display devices, such as LCDs (Liquid Crystal Display Devices), PDPs (Plasma Display Panels), ELDs (Electro luminescent Displays) and VFDs (Vacuum Fluorescent Displays), have been recently researched and used.

Among these, a display device using OLED (Organic Light-Emitting Diode) has an advantage in that the display device is excellent in brightness and viewing angle properties compared to an LCD device and does not require a backlight unit, thereby realizing an extremely slim device.

In order to follow recent trends in the development and consumption patterns of display devices, research with the goal of making display devices thinner and lighter has been intensively conducted.

Furthermore, research on a structure for coupling components of a display device to each other has been intensively conducted.

SUMMARY OF THE INVENTION

Therefore, the present disclosure has been made in view of the above problems, and it is an object of the present disclosure to provide a display device capable of coupling a back cover to a frame without an additional bracket.

Another object of the present disclosure is to provide a display device in which the back cover is capable of being coupled to the frame in a direction intersecting the anteroposterior direction by means of the fixing member fixed to the frame.

A further object of the present disclosure is to provide a display device capable of preventing the fixing member fixed to the frame from being separated from the frame by the load imposed by back cover.

In accordance with an aspect of the present disclosure, the above and other objects can be accomplished by the provision of a display device including a display panel, a frame positioned behind the display panel, a back cover coupled to the frame so as to cover a rear surface of the frame, and a fixing member, which extends longitudinally and which is disposed between the frame and the back cover and is fixed to the frame, the fixing member having a fixing hole formed in a direction intersecting the longitudinal direction of the fixing member, wherein the back cover has therein a coupling hole at a location facing the fixing hole, and is coupled to the fixing member by means of a fastening member, which is inserted into the fixing hole through the coupling hole.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

A description will now be given in detail according to exemplary embodiments disclosed herein, with reference to the accompanying drawings. For the sake of brevity of description with reference to the drawings, the same or equivalent components are denoted by the same reference numbers, and a description thereof will not be repeated.

In general, suffixes such as "module" and "unit" may be used to refer to elements or components. The use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features, and it should be understood that the embodiments presented herein are not limited by the accompanying drawings. As such, the present disclosure should be construed to extend to any alterations, equivalents and substitutes, in addition to those which are particularly set out in the accompanying drawings.

It will be understood that although the terms "first," "second," etc. may be used herein to describe various elements, these elements should not be limited by these terms. These terms are only used to distinguish one element from another.

It will be understood that when an element is referred to as being "connected with" another element, intervening elements may be present. In contrast, it will be understood that when an element is referred to as being "directly connected with" another element, there are no intervening elements present.

A singular representation may include a plural representation unless the context clearly indicates otherwise.

In the present application, it should be understood that the terms "comprises," "includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
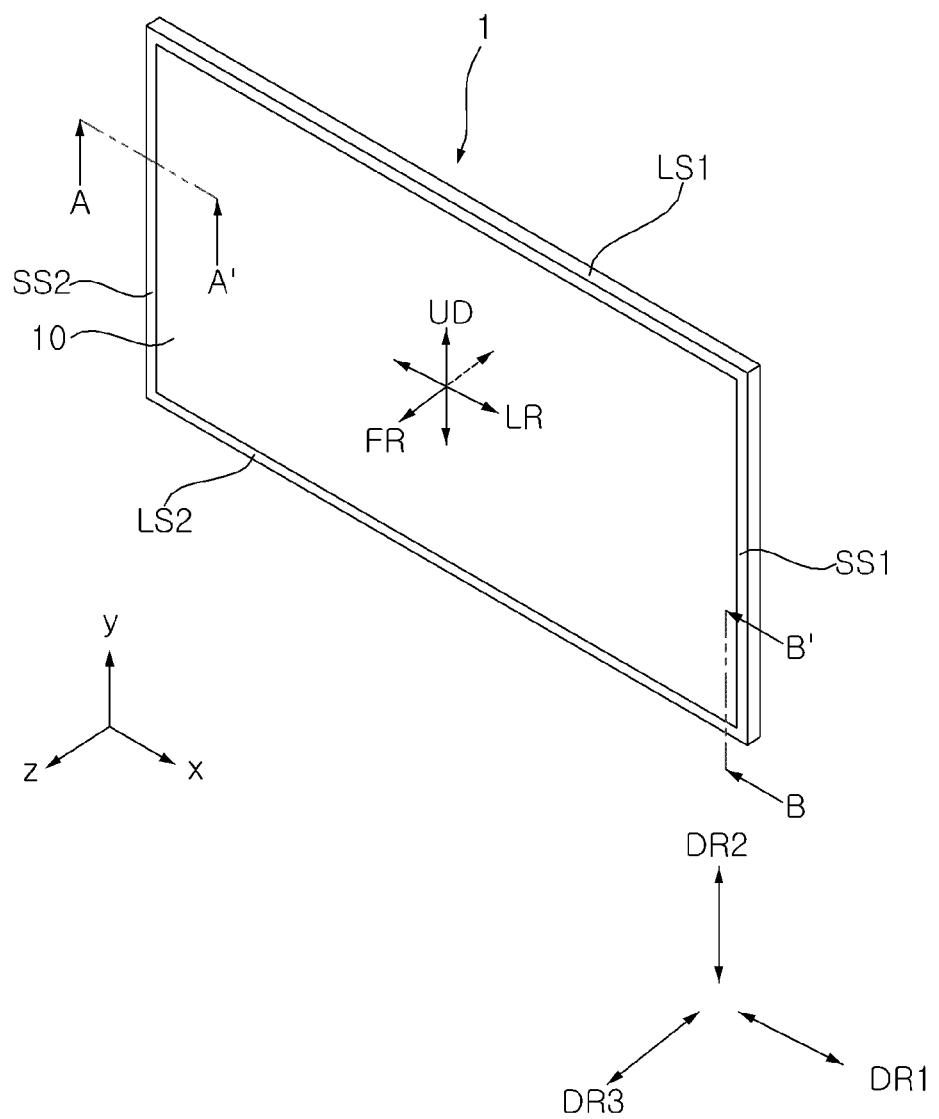
FIGS. 1 to 16 are views illustrating display devices according to embodiments of the present disclosure.

Referring to FIG. 1, the display device 1 may include a display panel 10. The display panel 10 may display a screen.

The display panel 10 may include a first long side LS1, a second long side LS2, which faces the first long side LS1, a first short side SS1 adjacent to the first long side LS1 and the second long side LS2, and a second short side SS2, which faces the first short side SS1. Although each of the first and second long sides LS1 and LS2 is illustrated and described as being longer than each of the first and second short sides SS1 and SS2 for convenience of explanation, the length of each of the first and second long sides LS1 and LS2 may be almost the same as that of each of the first and second short sides SS1 and SS2.

A direction parallel to the first and second long sides LS1 and LS2 of the display panel 10 may be referred to as a first direction DR1 or a lateral direction LR. A direction parallel to the first and second short sides SS1 and SS2 of the display panel 110 may be referred to as a second direction DR2 or a vertical direction UD. A direction perpendicular to the first and second long sides LS1 and LS2 and the first and second short sides SS1 and SS2 of the display panel 10 may be referred to as a third direction DR3 or an anteroposterior direction FR. Here, the direction in which the display panel 10 displays an image may be referred to as a forward direction, and the direction opposite the forward direction may be referred to as a rearward direction.

Although the display panel 10 will hereinafter be described based on a display panel employing organic light-emitting diodes (OLED), the display panel 10 applicable to the present disclosure is not limited thereto.

Figure 2:
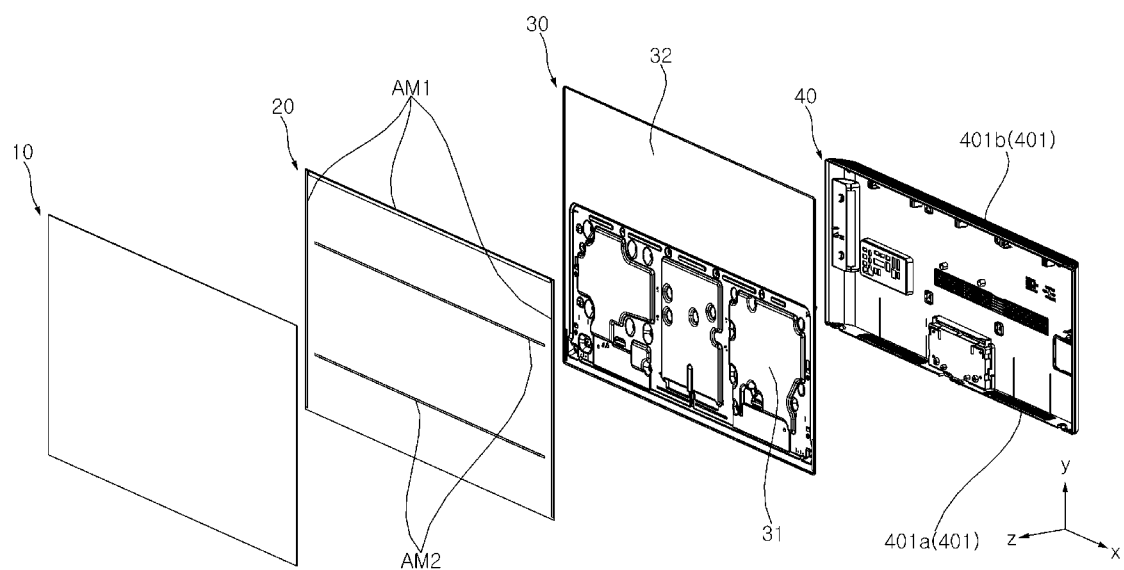

Referring to FIG. 2, the display device 1 may include the display panel 10, a plate 20, a frame 30 and a back cover 40.

The display panel 10 may define the front surface of the display device 1, and may display an image on the front surface of the display device 1. The display panel 10 may divide an image into a plurality of pixels, and may control the color, brightness and chroma of each of the pixels, thereby outputting the image. The display panel 10 may be divided into an active area, in which an image is displayed, and an inactive area, in which an image is not displayed. The display panel 10 may generate light corresponding to red, green or blue in response to a control signal.

The plate 20 may be positioned behind the display panel 10. The plate 20 may be configured to have a shape corresponding to the overall shape of the display panel 10. The plate 20 may absorb heat generated from the display panel 10 during operation of the display device 1, and/or heat generated from a PCB 70 coupled to the frame 30, which will be described later. The heat absorbed into the plate 20 may be uniformly dispersed throughout the plate 20.

Accordingly, it is possible to prevent the occurrence of local hot spots on the display panel 10 due to the heat generated during operation of the display device 1. Here, the plate 20 may be referred to as an inner plate, a radiation plate or a heat sink. The plate 20 may increase the torsional rigidity and/or the bending rigidity of the display device 1. For example, the plate 20 may include a metal material.

The frame 30 may be positioned behind the plate 20. The frame 30 may be configured to have a plate shape overall. A PCB 70, on which a plurality of electronic elements are positioned, may be mounted on the frame 30. Here, the frame 30 may be referred to as a frame, a flat frame or a module cover. For example, the frame 30 may include a metal material.

The back cover 40 may cover the rear surface of the frame 30. The back cover 40 may define the rear surface of the display device 1. The back cover 40 may include a middle cover 41 and a side cover 42. The middle cover 41 may be configured to have a plate shape overall, and may be coupled to the side cover 42. The side cover 42 may extend along the edge of the middle cover 41, and may be configured to have a rectangular frame shape overall. For example, the middle cover 41 may include a metal material, and the side cover 42 may include a plastic material. In this case, holes 401 may be formed through the upper and lower sides of the side cover 42 so as to allow air to be introduced and discharged therethrough. Accordingly, the display device 1 may be cooled by the air flowing through the holes 401.

Figure 3:
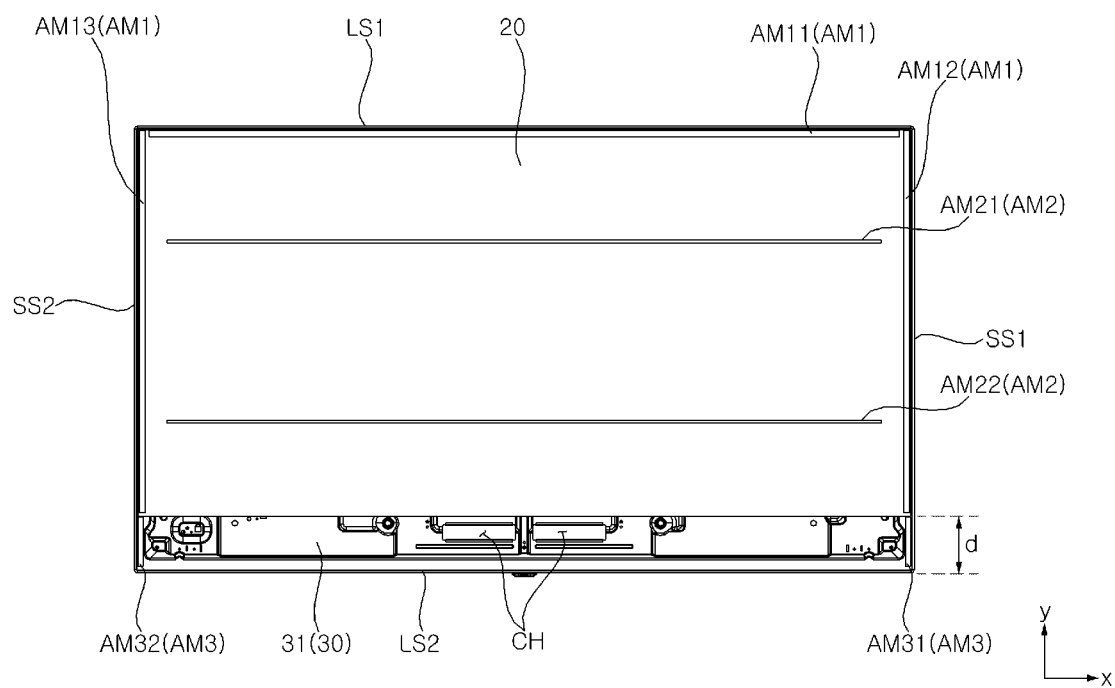
Figure 5:
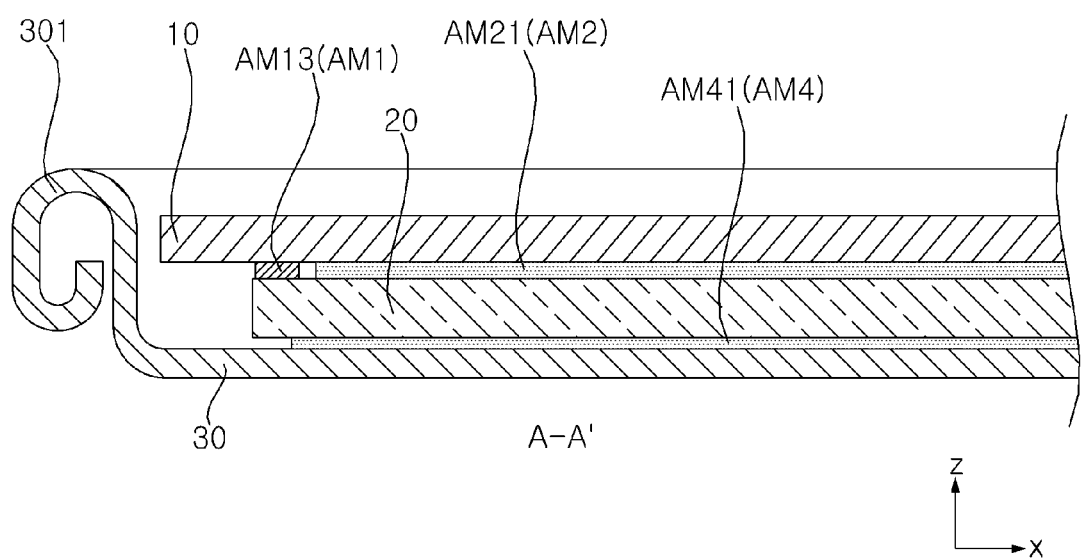

Referring to FIGS. 3 and 5, adhesive members AM1 and AM2 may be coupled to the front surface of the plate 20. For example, the adhesive members AM1 and AM2 may include a plurality of adhesive members. For example, the plurality of adhesive members AM1 and AM2 may include an outer adhesive member AM1, which is disposed adjacent to the edge of the plate 20 and extends therealong, and an inner adhesive member AM2, which is positioned inside the plate 20 and extends in a lateral direction.

Specifically, the outer adhesive member AM1 may include a first outer adhesive member AM11, which extends along the upper side of the plate 20, a second outer adhesive member AM12, which extends along the left side of the plate 20, and a third outer adhesive member AM13, which extends along the right side of the plate 20. The inner adhesive member AM2 may include a first inner adhesive member AM21, which is positioned at an upper level, and a second inner adhesive member AM22, which is positioned at a lower level.

Here, the plate 20 may be coupled to the rear surface of the display panel 10 via the adhesive members AM1 and AM2. For example, each of the adhesive members AM1 and AM2 may be a piece of double-sided adhesive tape.

Figure 4:
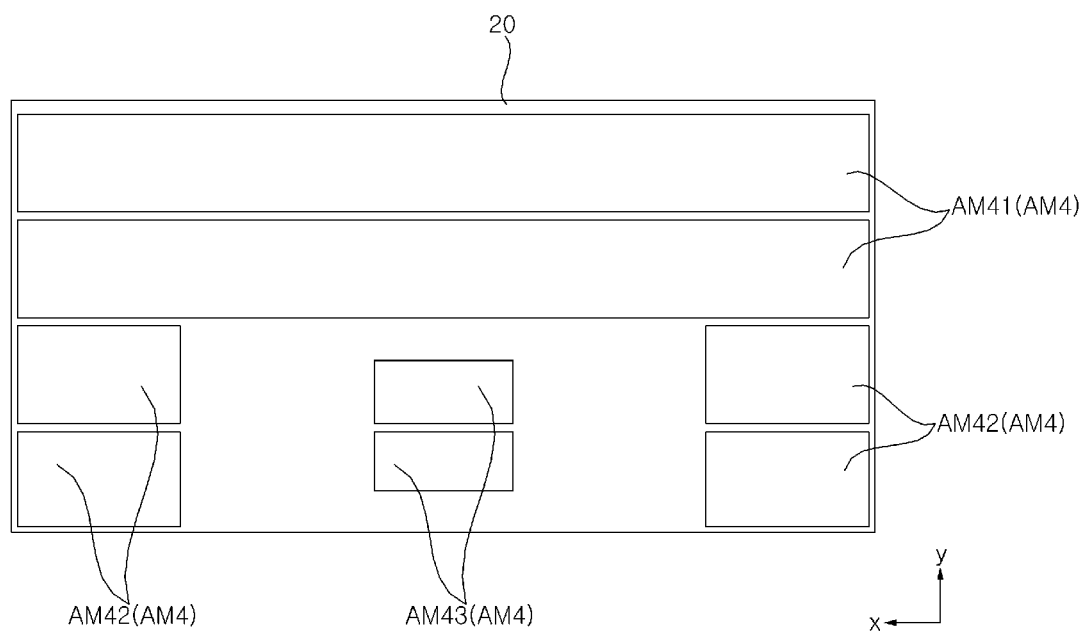

Referring to FIGS. 4 and 5, an adhesive member AM4 may be coupled to the rear surface of the plate 20. For example, the adhesive member AM4 may include a plurality of adhesive members. For example, the plurality of adhesive members AM4 may include outer adhesive members AM41 and AM42, which are disposed at the outer sides thereof adjacent to the edge of the plate 20 and extend in the lateral direction, and an inner adhesive member AM43, which is positioned at a medial region of the plate 20 and extends in the lateral direction.

Specifically, the outer adhesive members AM41 and AM42 may include a first outer adhesive member AM41, which is positioned at an upper level, and a second outer adhesive member AM42, which is positioned at a lower level.

Here, the plate 20 may be coupled to the front surface of the frame 20 via the adhesive member AM4. For example, the adhesive member AM4 may be a piece of double-sided adhesive tape.

Figure 6:
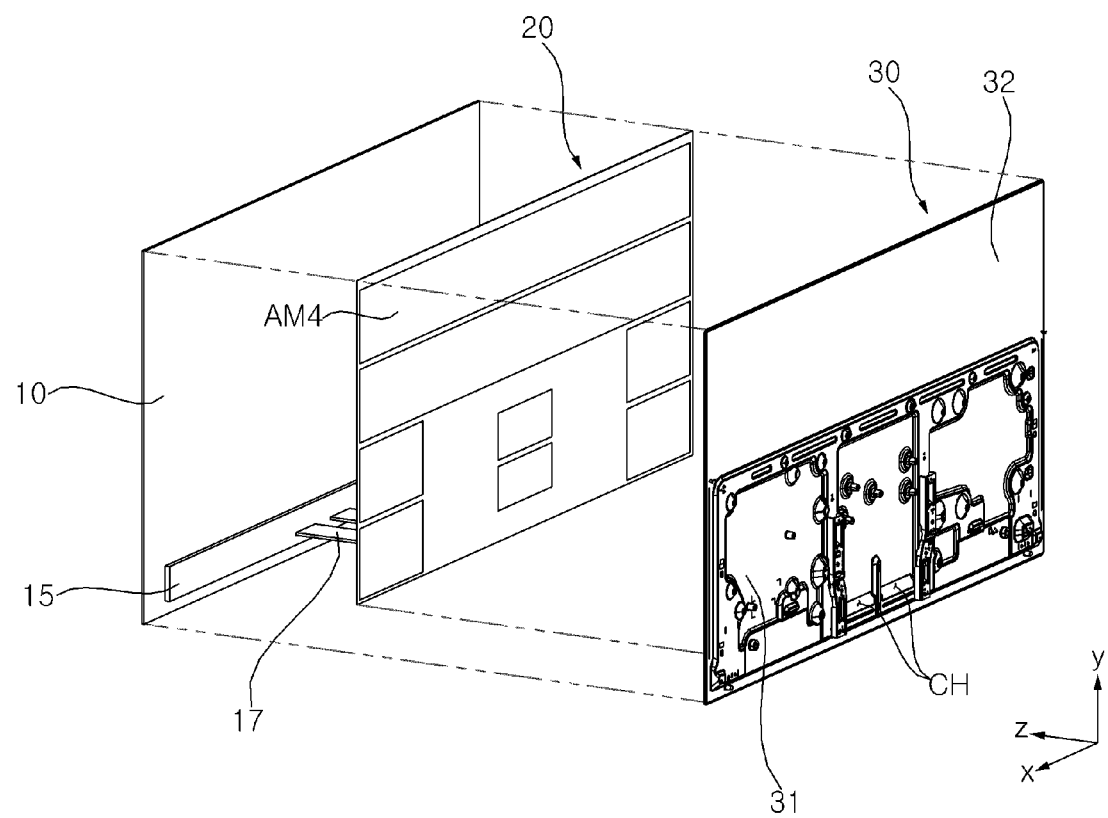

Referring to FIGS. 3 and 6, an S-PCB (Source Printed Circuit Board) 15 may be coupled to the rear surface of the display panel 10 adjacent to the lower side of the display panel 10. Here, the S-PCB 15 may be referred to as a source PCB. The S-PCB 15 may be electrically connected to the display panel 10. A cable 17 may be electrically connected to the S-PCB 15. The cable 17 may be electrically connected to a T-CON board (Timing Controller Board) (not shown) mounted on the frame 30 so as to transmit digital video data and a timing control signal to the S-PCB 15. For example, the cable 17 may be a FFC (Flexible Flat Cable).

The lower side of the plate 20 may be spaced apart from the lower side of the frame 30 by a predetermined distance d. A cable hole CH may be formed through the frame 30 between the lower side of the plate 20 and the lower side of the frame 30 so as to allow the cable 17 to extend therethrough. Here, the cable 17 may extend through the cable hole CH between the lower side of the plate 20 and the lower side of the frame 30, and may be connected to the T-CON board mounted on the rear surface of the frame 30.

Figure 7:
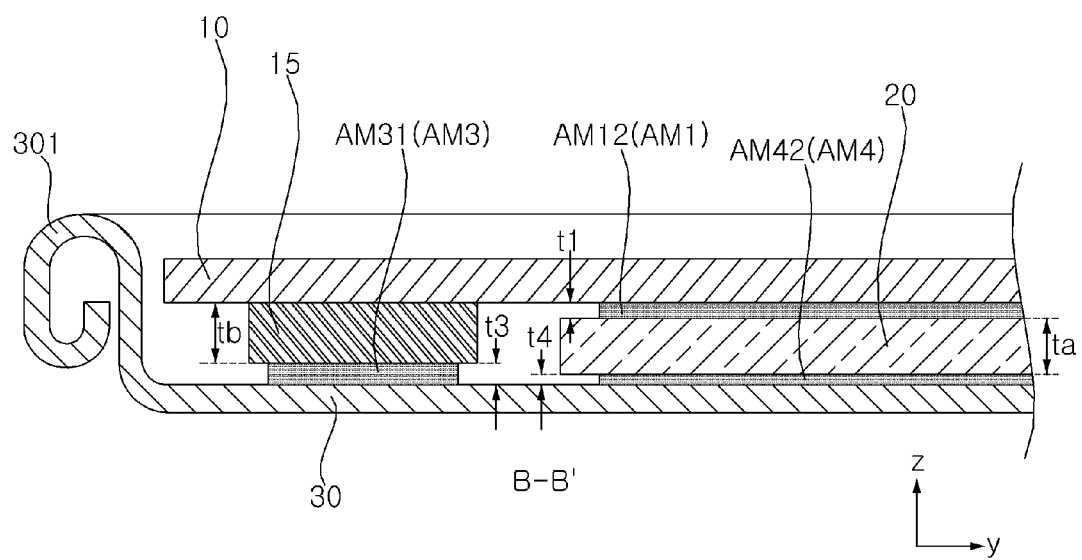

Referring to FIGS. 3 and 7, a third adhesive member AM3 may be coupled both to the S-PCB 15 and to the frame 30 between the lower side of the plate 20 and the lower side of the frame 30. For example, the third adhesive member AM3 may be a piece of double-sided adhesive tape.

The adhesive members AM1 and AM2 may be disposed between the display panel 10 and the plate 20 and coupled both to the display panel 10 and to the plate 20. Here, the adhesive members AM1 and AM2 may be referred to as first adhesive members.

The adhesive member AM4 may be disposed between the plate 20 and the frame 30, and may be coupled both to the plate 20 and to the frame 30. Here, the adhesive member AM4 may be referred to as a second adhesive member.

The sum of the thickness t1 of the first adhesive members AM1 and AM2, the thickness to of the plate 20 and the thickness t4 of the second adhesive member AM4 may be equal to the sum of the thickness tb of the S-PCB 15 and the thickness t3 of the third adhesive member AM3.

Accordingly, the front surface of the S-PCB 15 and the front surface of the first adhesive members AM1 and AM2 may be flush with each other in the lateral direction, and may be coupled to the rear surface of the display panel 10.

Referring again to FIGS. 5 and 7, the end of the frame 20 may be bent so as to form a bent portion 301. A portion of the bent portion 301 may become flat so as to define the side appearance of the display device 1.

Figure 8:
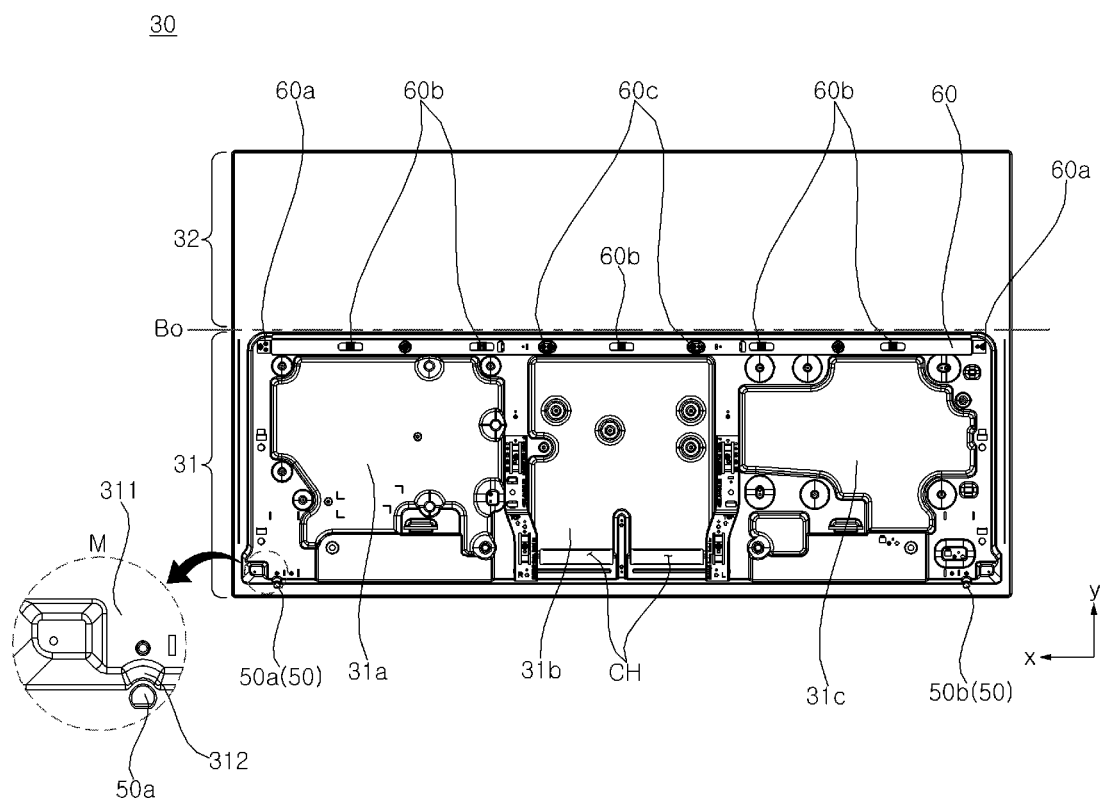

Referring to FIG. 8, the frame 30 may include a first part 31, positioned under a boundary Bo, and a second part 32, positioned above the boundary Bo.

A plurality of PCBs 70 (not shown) may be mounted on the first part 31. The PCBs 70 may be referred to as boards. For example, the PCB may include a power supply board 71 for supplying power to individual components of the display device 1, a timing controller board 72 for providing an image signal to the display panel 10, and a main board 73 for controlling the individual components of the display device 1. The plurality of PCBs 70 may be electrically connected to each other and to the individual components of the display device 100.

The power supply board 71 may be mounted on a first region 31a of the first part 31, the timing controller board 72 may be mounted on a second region 31b, and the main board 73 may be mounted on a third region 31c. The cable hole CH may be formed adjacent to the lower side of the first part 31.

The rear surface of the second part 32 may be flat. The back cover 40 may be coupled to the first part 31 so as to cover the first cover 31. Here, the second part 32 and the back cover 40 may collectively define the rear surface of the display device 1.

Figure 9:
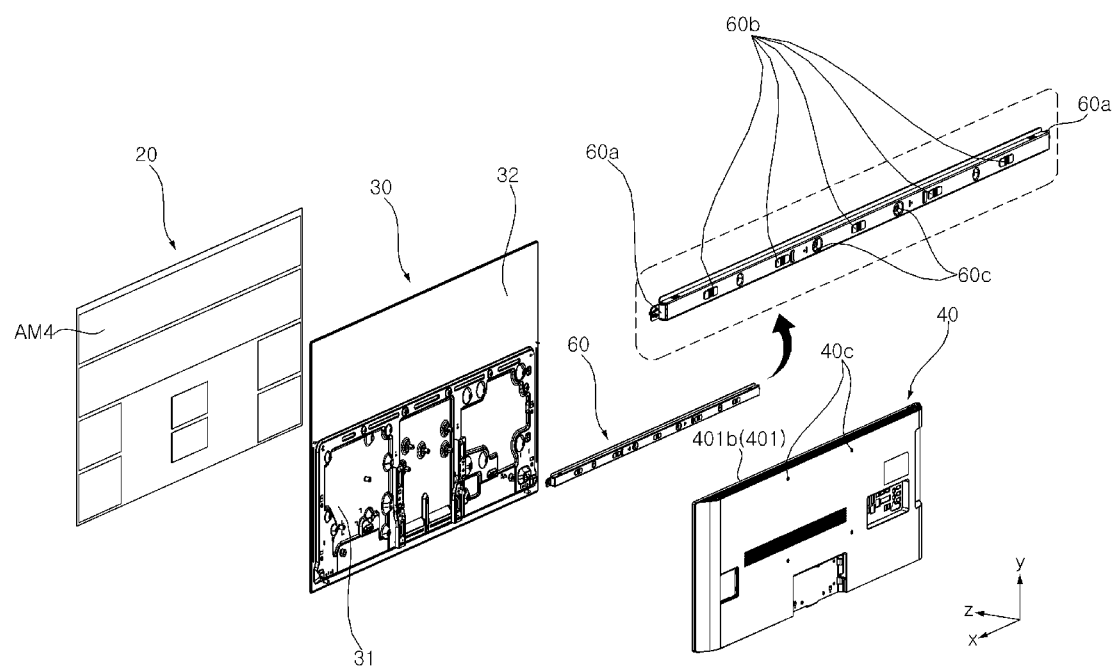

Referring to FIGS. 8 and 9, a reinforcing bar 60 may be positioned between the first part 31 and the back cover 40, and may extend in the lateral direction. The reinforcing bar 60 may be fixed to the first part 31 adjacent to the boundary Bo between the first part 31 and the second part 32 adjacent to the first part 31. For example, the reinforcing bar 60 may be fixed to the first part 31 via first fixing members 60a, which are positioned at opposite ends of the reinforcing bar 60 in a longitudinal direction.

The back cover 40 may be coupled to the reinforcing bar 60. For example, the back cover 40 may be coupled to the reinforcing bar 60 such that the upper side of the back cover 40 and the upper side of the reinforcing bar 60 are adjacent to each other. Here, the back cover 40 may be coupled to the reinforcing bar 60 by means of members that are engaged with second fixing members 60b of the reinforcing bar 60. Furthermore, the back cover 40 may be fixed to the reinforcing bar 60 by means of fastening members (not shown), such as screws, which are inserted into holes 60c in the reinforcing bar 60.

The reinforcing bar 60 may be fixed to the first part 31 adjacent to the second part 32, at which reinforcing portions 311 of the first part 31 are not formed, thereby increasing the torsional rigidity and/or bending rigidity of the frame 30. For example, the reinforcing bar 60 may include a metal material.

Figure 10:
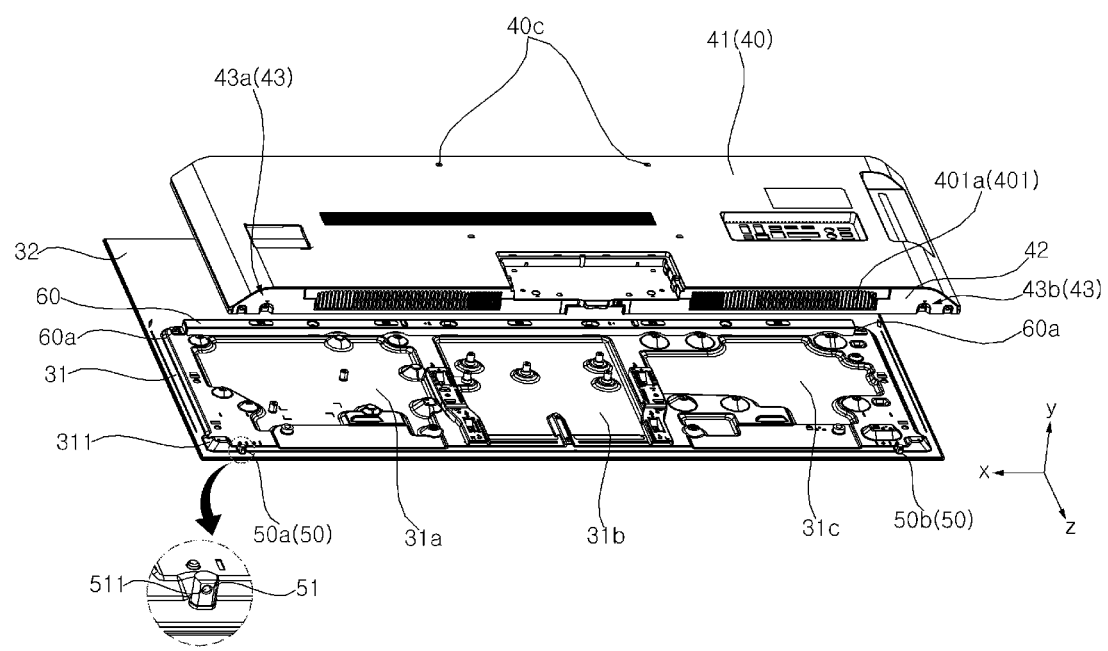
Figure 11:
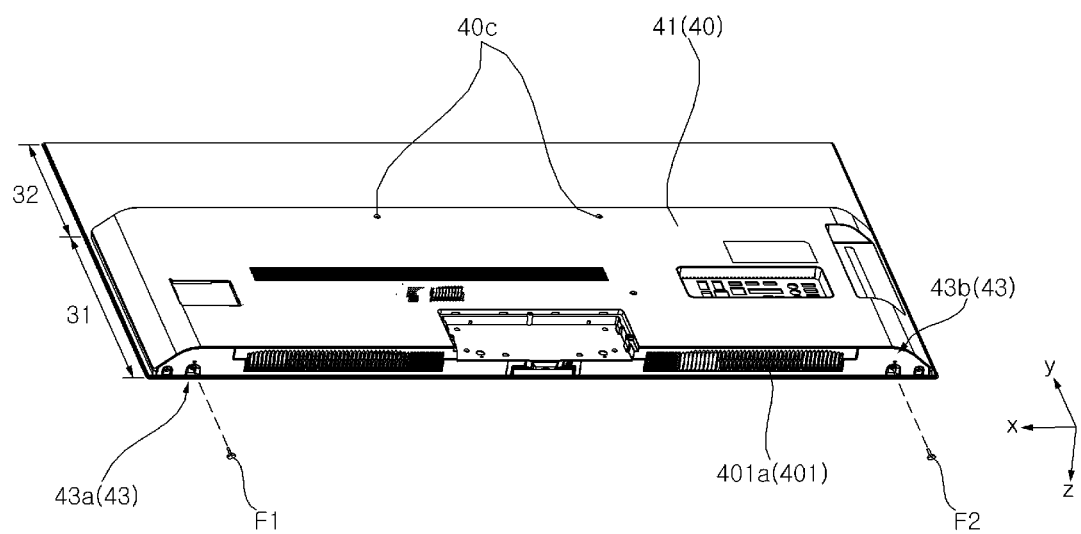

Referring to FIGS. 10 and 11, a fixing member 50, which extends longitudinally, may be disposed between the first part 31 and the back cover 40 and may be fixed to the first part 31. For example, the fixing member 50 may include a pair of fixing members 50a and 50b, which are positioned adjacent to the lower side of the first part 31 and are spaced apart from each other in the lateral direction.

Each of the fixing members 50 may have therein a fixing hole 511, which is formed in a direction intersecting the longitudinal direction of the fixing member 50. For example, the longitudinal direction of the fixing member 50 may be the anteroposterior direction. The fixing member 50 may be a PEM nut.

Coupling holes 433 (see FIG. 16) may be formed in the back cover 40 at locations corresponding to the fixing holes 511. Accordingly, the back cover 40 may be coupled to the fixing members 50 by means of fastening members F1 and F2, which are inserted into the fixing holes 511 through the coupling holes 433. Specifically, the coupling holes 433 may be formed in the coupling portion 43 of the side cover 42. For example, the coupling portion 43 may include a pair of coupling portions 43a and 43b, which are provided at one side of the side cover 42, are positioned so as to correspond to the pair of coupling holes 50a and 50b, and are spaced apart from each other in the lateral direction.

Accordingly, the back cover 40 may be coupled to the fixing member 50 in a direction intersecting the longitudinal direction of the fixing member 50.

Figure 12:
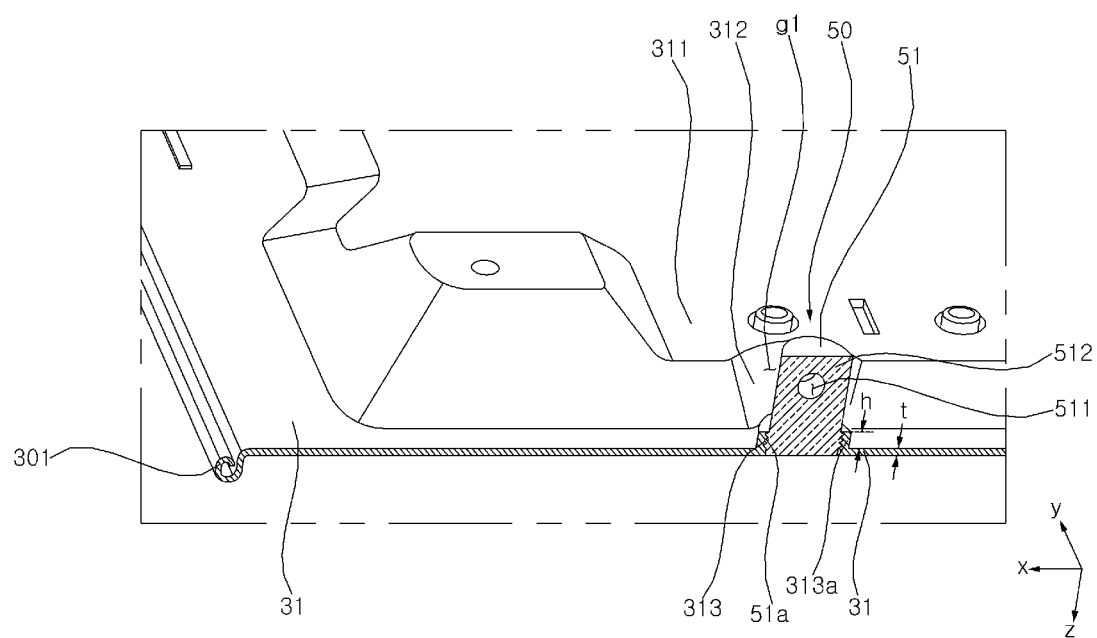
Figure 13:
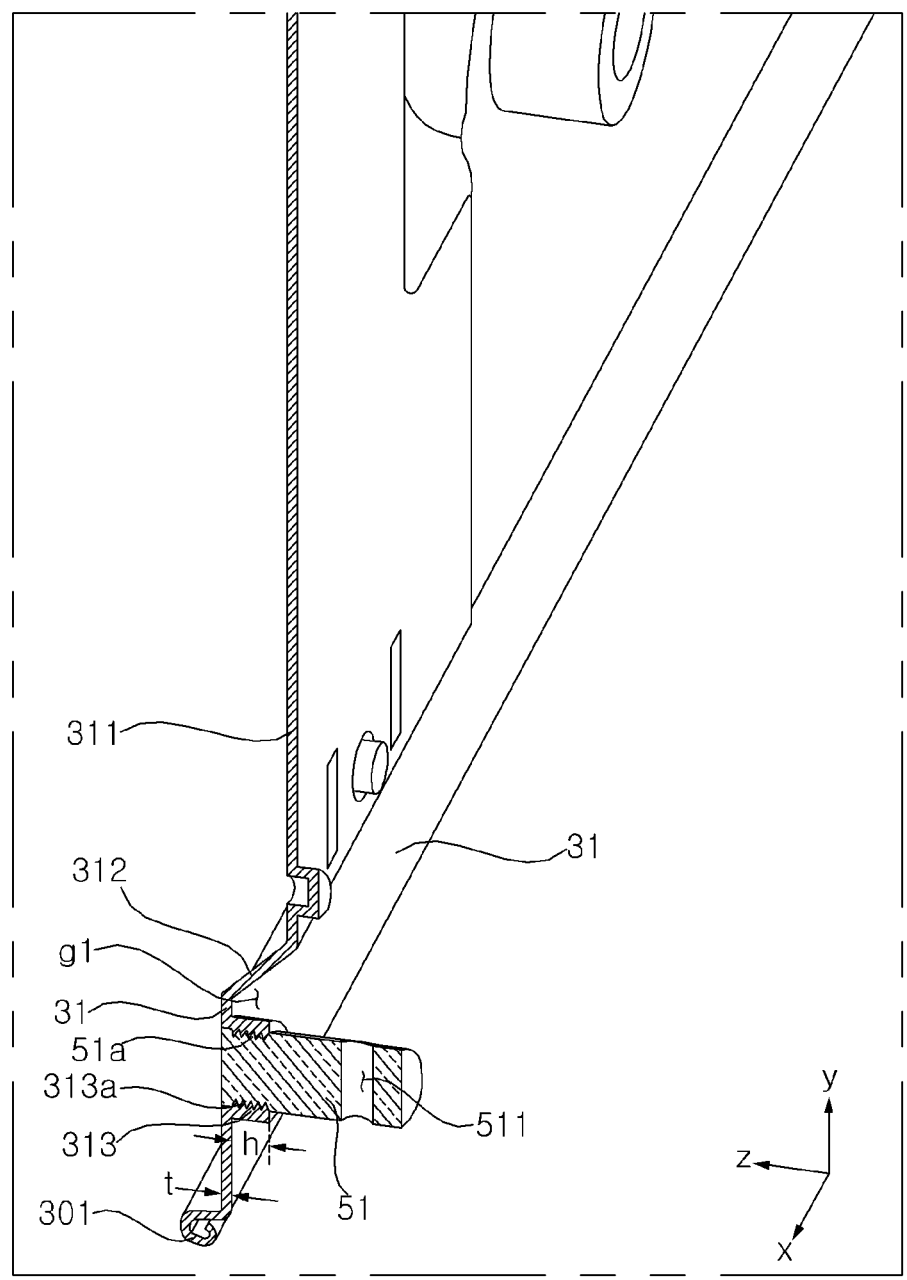

Referring to FIGS. 12 and 13, the fixing member 50 may include a body 51, which extends in the longitudinal direction (for example, in the anteroposterior direction) of the fixing member 50 and which is provided at at least a portion of the outer surface thereof with a groove Ma, which is engaged with the first part 31. Here, the first part 31 may include a rib 313, in which the body 51 is positioned and which has an inner surface 313a that is engaged with the groove Ma.

Here, the groove Ma and the inner surface 313a may be threads that are engaged with each other. In other words, the groove 51 and the inner surface 313a may be threadedly coupled to each other. Alternatively, the groove Ma and the inner surface 313a may be knurled so as to be engaged with each other.

The rib 313 may project rearwards from the first part 31 along the outer surface of the body 51 in order to support one side of the body 51. Specifically, the rib 313 may project rearwards from the first part 31, having a thickness t, by a distance h. Here, the portion of the body 51 that corresponds to a length of t+h from the front end of the first part 31 may be in contact with the first part 31, and the rib 313 and may thus be supported thereby.

Hence, since the coupling portion 43 is coupled to the fixing member 50, it is possible to prevent the fixing member 50 from being separated from the first part 31 even when the load of the back cover 40 is applied to the fixing member 50. Accordingly, the coupled state between the fixing member 50 and the back cover 40 may be stably maintained.

Figure 14:
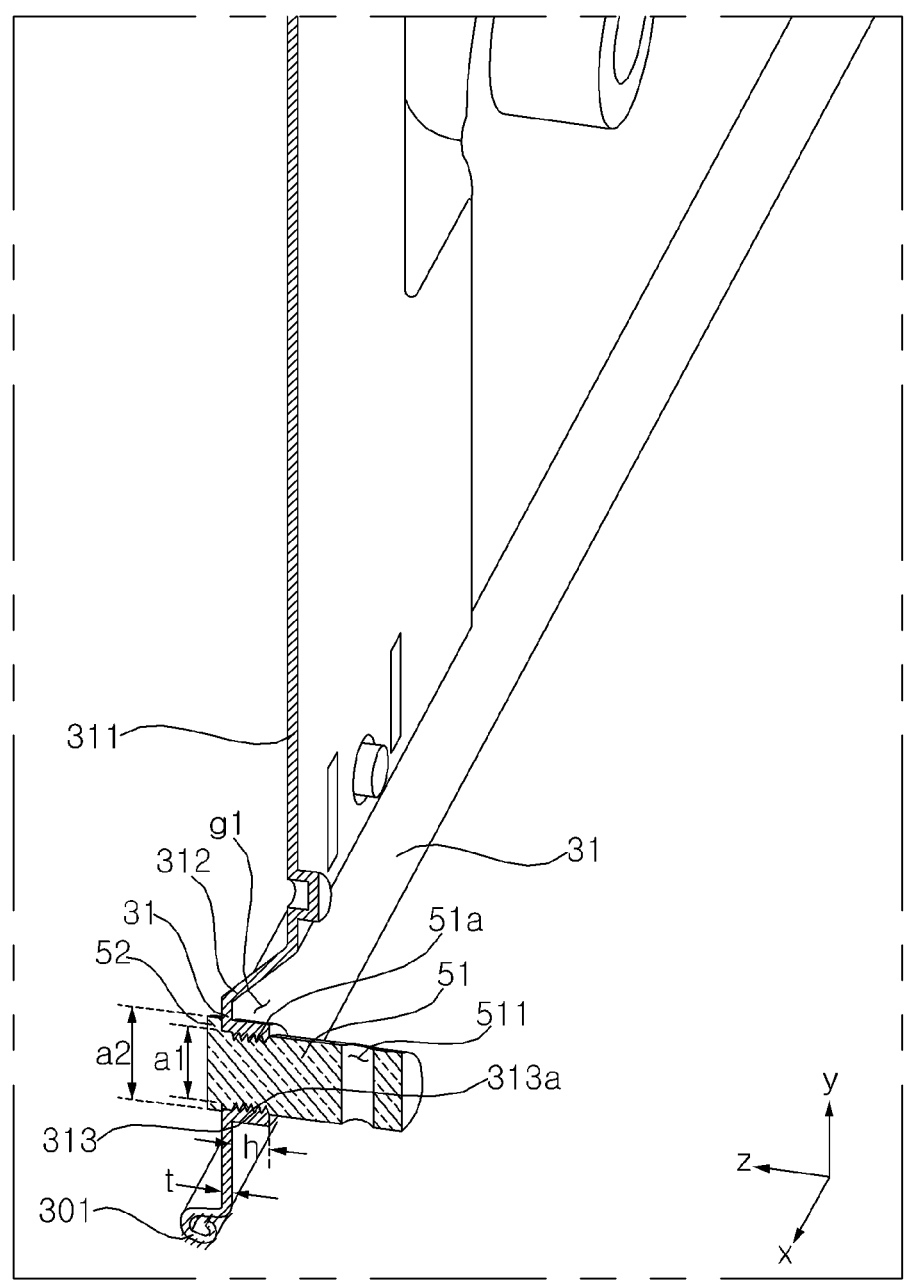

Referring to FIG. 14, the fixing member 50 may include a head 52, which is formed at one end (for example, the front end) of the body 51 in the longitudinal direction (for example, in the anteroposterior direction) of the body 51 and which has a diameter larger than the internal diameter of the rib 323.

The rib 313 may be configured to have a cylinder shape having an internal diameter a1. The head 52 may be configured to have a circular plate shape having a diameter a2 larger than the internal diameter a1 of the rib 313. The rear surface of the head 52 may be in contact with the front surface of the rib 313.

Accordingly, since the coupling portion 43 is coupled to the fixing member 50, it is possible to reliably prevent the fixing member 50 from being separated from the first part 31 even when the load of the back cover 40 is applied to the fixing member 50.

Figure 15:
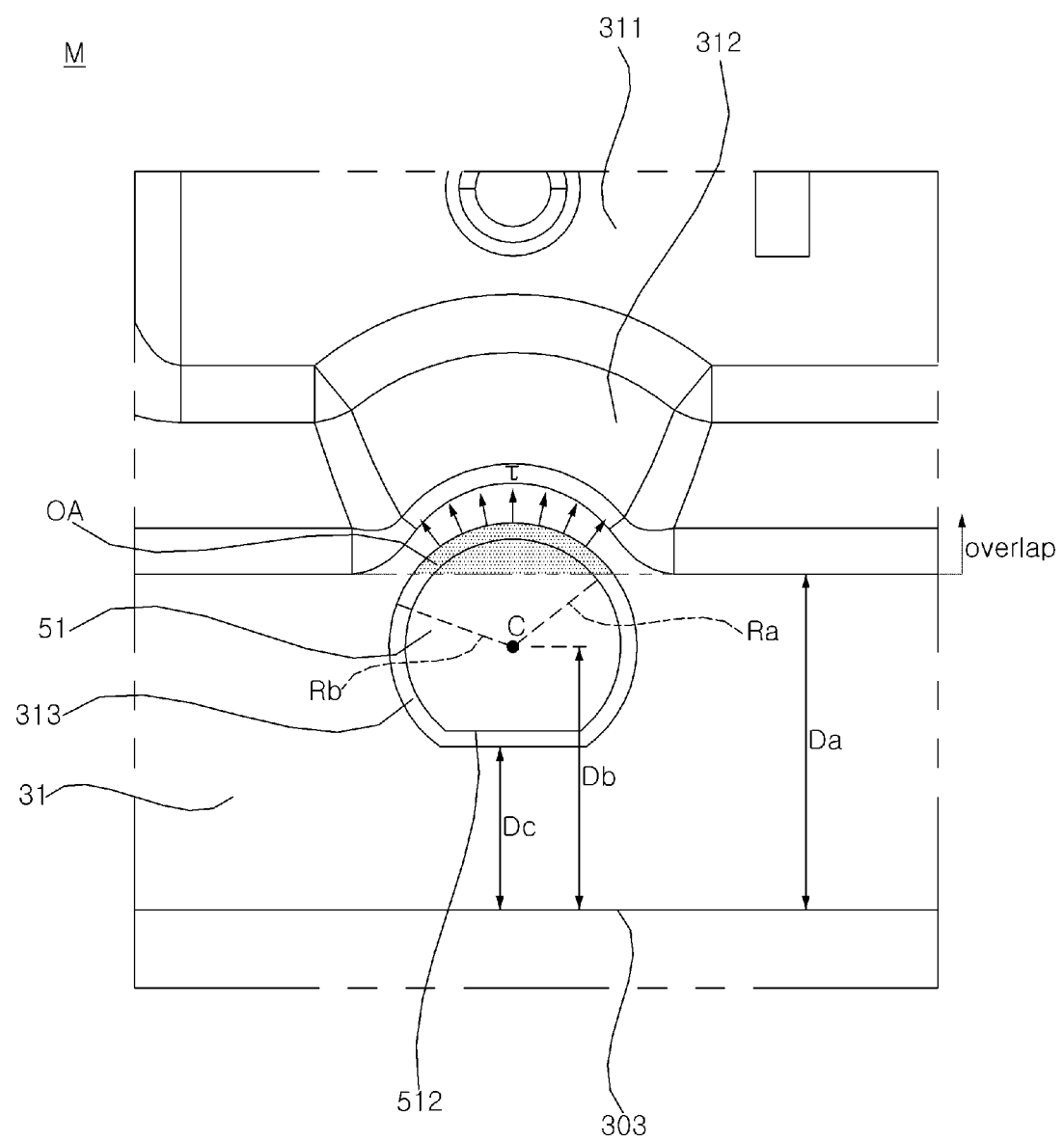

Referring to FIGS. 13 and 15, the first part 31 may face the back cover 40, and the reinforcing portion 311 may be spaced apart from the edge of the first part 31. The first part 31 may be referred to as a base. The reinforcing portion 311 may be formed by subjecting the first part 31 to pressing. In other words, the reinforcing portion 311 may be depressed rearwards from the first part 31 so as to define a step 312. The step 312 may be obliquely formed. The step 312 may be referred to as a sloped portion.

Consequently, the reinforcing portion 311 may increase the torsional rigidity and/or bending rigidity of the frame 30. For example, the frame 30 may include a metal material. For example, the reinforcing portion 311 may be formed at a portion of the first part 31 excluding the first region 31a, the second region 31b and the third region 31c.

The fixing member 50 may be positioned adjacent to the reinforcing portion 311. The fixing member 50 may be spaced apart from the edge of the frame 30 so as to be adjacent to the reinforcing portion 311. A portion of the reinforcing portion 311 may be formed adjacent to the outer periphery of the fixing member 50 and the rib 313 along the outer periphery.

Specifically, the step 312 may be obliquely formed, and may be adjacent to the fixing member 50 and the rib 313. Here, a spacing g1 may be defined between the step 312 and the rib 313. The body 51 of the fixing member 50 may have a first radius Ra from the center C, and the rib 313 may have a second radius Rb from the center C. The step 312 may have a radius from the center C, which is larger than any of the first radius Ra and the second radius Rb. The step 312 may be obliquely formed at a blunt angle with respect to the first part 31 such that the radius of the step 312 increases moving rearwards.

The fixing member 50 and the rib 313 may be positioned close to the step 313 such that the fixing member 50 and the rib 313 overlap the reinforcing portion 311, adjacent to the step 312, in the lateral direction so as to define an overlapping area OA. Due to the reinforcing portion 311 and the step 312, which are formed by subjecting the first part 31 to pressing, stress τ may be applied along the first part 31 in a direction perpendicular to the overlapping area OA of the fixing member 50 and the rib 313.

Accordingly, since the coupling portion 43 is coupled to the fixing member 50, it is possible to reliably prevent the fixing member 50 from being separated from the first part 31 even when the load of the back cover 40 is applied to the fixing member 50.

The reinforcing portion 311 adjacent to the step 312 may be formed so as to be spaced apart from the lower side 303 of the frame 30 by a first distance Da. The center of curvature of the step 312 may be spaced apart from the lower side 303 of the frame 30 by a second distance Db smaller than the first distance Da. Here, because the center of the body 51 is positioned at the center of curvature of the step 312, both the center of the body 51 and the center of curvature of the step 312 may coincide with the above-mentioned center C.

A contact portion 512 of the body 51 may be spaced apart from the lower side 303 of the frame 30 by a third distance Dc.

Figure 16:
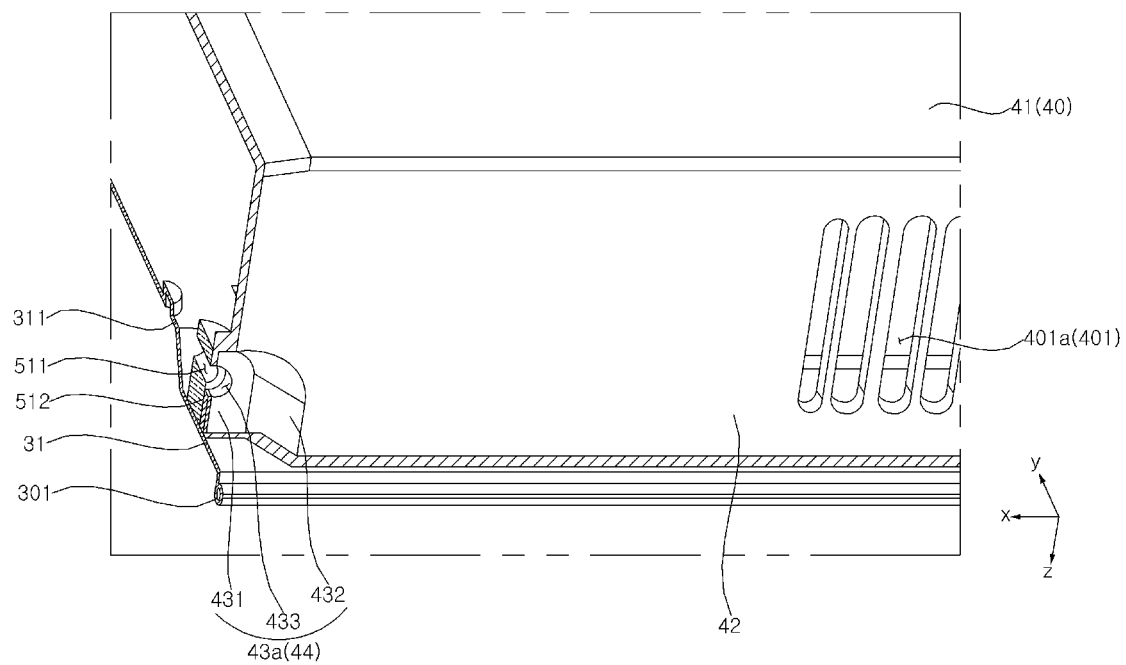

Referring to FIGS. 15 and 16, the fixing member 50 may have formed therein the fixing hole 511, and may include a contact portion 512, which is formed by cutting out a portion of the outer circumferential surface of the fixing member 50. The contact portion 512 (see FIG. 12) may be formed on the lower surface of the body 51. The coupling portion 43 may have formed therein the coupling hole 433, and may be configured to have a shape corresponding to the shape of the contact portion 512 so as to be in contact with the contact portion 512.

Because the contact portion 512 is formed on the body 51 so as to be spaced apart from the lower side 303 of the frame 30 by the third distance Dc, a depressed portion 431 of the coupling portion 43 may be depressed upwards from the side cover 42 so as to be in contact with the contact portion 512. The depressed portion 431 may be depressed from the side cover 42 so as to define a step 432. The coupling hole 433 may be formed in the depressed portion 431 so as to be aligned with the fixing hole 511.

Accordingly, fastening members F1 and F2, such as screws, may be inserted into the fixing holes 511 through the coupling holes 433 from the lower side of the side cover 42. Consequently, the side cover 42 may be coupled to the fixing members 50 by means of the fastening members F1 and F2. Here, the fastening members F1 and F2 may be covered by the steps 432 so as not to be exposed in the anteroposterior direction or the lateral direction.

In accordance with an aspect of the present disclosure, provided is a display device including a display panel, a frame positioned behind the display panel, a back cover coupled to the frame so as to cover a rear surface of the frame, and a fixing member, which extends longitudinally and which is disposed between the frame and the back cover and is fixed to the frame, the fixing member having a fixing hole formed in a direction intersecting the longitudinal direction of the fixing member, wherein the back cover has therein a coupling hole at a location facing the fixing hole, and is coupled to the fixing member by means of a fastening member, which is inserted into the fixing hole through the coupling hole.

In accordance with another aspect of the present disclosure, the fixing member may extend in the longitudinal direction thereof, and may have a groove, which is formed in at least a portion of an outer surface thereof and is engaged with the frame, and the frame may include a rib, in which the body is disposed and an inner surface of which is engaged with the groove.

In accordance with another aspect of the present disclosure, the fixing member may further include a head, which is coupled to one end of the body in a longitudinal direction of the body and which has a diameter larger than an internal diameter of the rib and is in contact with a front surface of the rib.

In accordance with another aspect of the present disclosure, the rib may project rearwards from the frame along an outer surface of the body in order to support the body.

In accordance with another aspect of the present disclosure, the fixing member may have formed therein a fixing hole, and may include a contact portion, which is formed by cutting out a portion of an outer circumferential surface of the fixing member, and the back cover may include a coupling portion having formed therein a coupling hole, the back cover having a shape corresponding to a shape of the contact portion and being in contact with the contact portion.

In accordance with another aspect of the present disclosure, the coupling portion may be depressed from the back cover in a direction in which the coupling portion comes into contact with the contact portion.

In accordance with another aspect of the present disclosure, the frame may include a base facing the back cover and a reinforcing portion, which is spaced apart from an edge of the base and which is formed by pressing the base rearwards, and the fixing member may be positioned adjacent to the reinforcing portion.

In accordance with another aspect of the present disclosure, a portion of the reinforcing portion may be positioned along the outer periphery of the fixing member adjacent to an outer periphery of the fixing member.

In accordance with another aspect of the present disclosure, the fixing member may be positioned adjacent to a lower side of the frame, the fixing hole may be formed through the fixing member in a vertical direction, and the coupling hole may be formed through the back cover in a vertical direction.

In accordance with another aspect of the present disclosure, the display device may further include a reinforcing bar, which is positioned between the frame and the back cover and extends in a lateral direction, the frame may include a first part, which overlaps the back cover in an anteroposterior direction and to which the fixing member is fixed, and a second part adjacent to the first part, and the reinforcing bar may be fixed to the first part, adjacent to a boundary between the first part and the second part, the back cover being coupled to the reinforcing bar.

In accordance with another aspect of the present disclosure, the reinforcing bar may include a metal material.

In accordance with another aspect of the present disclosure, the display device may further include an S-PCB coupled to a rear surface of the display panel adjacent to a lower side of the display panel, a cable electrically connected to the S-PCB, and a plate positioned between the display panel and the frame, a lower side of the plate may be spaced apart from a lower side of the frame in an upward direction, and the frame may have formed therein a cable hole, through which the cable extends and which is formed between the lower side of the plate and the lower side of the frame.

In accordance with another aspect of the present disclosure, the display device may further include a first adhesive member, disposed between the display panel and the plate and coupled both to the display panel and to the plate, a second adhesive member, disposed between the plate and the frame and coupled both to the plate and to the frame, and a third adhesive member, disposed between the lower side of the plate and the lower side of the frame and coupled both to the S-PCB and to the frame, and a sum of thicknesses of the first adhesive member, the plate and the second adhesive member may be equal to a sum of thicknesses of the S-PCB and the third adhesive member.

The effects of the display device according to the present disclosure will be described.

At least one embodiment of the present disclosure provides a display device capable of coupling the back cover to the frame without an additional bracket.

At least one embodiment of the present disclosure provides a display device in which the back cover is capable of being coupled to the frame in a direction intersecting the anteroposterior direction by means of the fixing member fixed to the frame.

At least one embodiment of the present disclosure provides a display device capable of preventing the fixing member fixed to the frame from being separated from the frame by the load imposed by the back cover.

Certain embodiments or other embodiments of the disclosure described above are not mutually exclusive or distinct from each other. Any or all elements of the embodiments of the disclosure described above may be combined with each other in configuration or function.

For example, a configuration "A" described in one embodiment of the disclosure and the drawings and a configuration "B" described in another embodiment of the disclosure and the drawings may be combined with each other. That is, even if the combination between the configurations is not directly described, the combination is possible except in the case where it is described that the combination is impossible.

Although embodiments have been described with reference to a number of illustrative embodiments thereof, it should be understood that numerous other modifications and embodiments that fall within the scope of the principles of this disclosure can be devised by those skilled in the art. More particularly, various variations and modifications are possible in the component parts and/or arrangements within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a frame positioned behind the display panel;
a back cover coupled to the frame so as to cover a rear surface of the frame; and
a fixing member, which extends longitudinally and which is disposed between the frame and the back cover and is fixed to the frame, the fixing member having a fixing hole formed in a direction intersecting the longitudinal direction of the fixing member,
wherein the back cover has therein a coupling hole at a location facing the fixing hole, and is coupled to the fixing member by means of a fastening member, which is inserted into the fixing hole through the coupling hole,
wherein a portion of the fixing member passes through the frame, and
wherein the fixing member comprises a body extending in the longitudinal direction of the fixing member, and has a groove, which is formed in at least a portion of an outer surface thereof and is engaged with the frame,
wherein the frame comprises a rib, in which the body is disposed and an inner surface of which is engaged with the groove, and
wherein the fixing member comprises a head, which is coupled to one end of the body in a longitudinal direction of the body, which has a diameter larger than an internal diameter of the rib and which is in contact with a front surface of the rib.

2. The display device according to claim 1, wherein the rib projects rearwards from the frame along an outer surface of the body in order to support the body.

3. The display device according to claim 1, wherein the fixing member further comprises a contact portion having formed therein the fixing hole, and which is formed by cutting out a portion of an outer circumferential surface of the fixing member, and wherein the back cover comprises a coupling portion having formed therein the coupling hole, the back cover having a shape corresponding to a shape of the contact portion and being in contact with the contact portion.

4. The display device according to claim 3, wherein the coupling portion is depressed from the back cover in a direction in which the coupling portion comes into contact with the contact portion.

5. The display device according to claim 4, wherein the frame comprises:

a base facing the back cover; and a reinforcing portion, which is spaced apart from an edge of the base and which is formed by pressing the base rearwards, and wherein the fixing member is positioned adjacent to the reinforcing portion.

6. The display device according to claim 5, wherein a portion of the reinforcing portion is positioned along an outer periphery of the fixing member adjacent to the outer periphery of the fixing member.

7. The display device according to claim 1, wherein the fixing member is positioned adjacent to a lower side of the frame, wherein the fixing hole is formed through the fixing member in a vertical direction, and wherein the coupling hole is formed through the back cover in a vertical direction.

8. The display device according to claim 1, further comprising a reinforcing bar, which is positioned between the frame and the back cover and extends in a lateral direction, wherein the frame comprises:

a first part, which overlaps the back cover in an antero-posterior direction and to which the fixing member is fixed; and a second part adjacent to the first part, and wherein the reinforcing bar is fixed to the first part adjacent to a boundary between the first part and the second part, the back cover being coupled to the reinforcing bar.

9. The display device according to claim 8, wherein the reinforcing bar comprises a metal material.

10. The display device according to claim 1, further comprising:

an S-PCB coupled to a rear surface of the display panel adjacent to a lower side of the display panel;

a cable electrically connected to the S-PCB; and a plate positioned between the display panel and the frame, wherein a lower side of the plate is spaced apart from a lower side of the frame in an upward direction, and wherein the frame has formed therein a cable hole, through which the cable extends and which is formed between the lower side of the plate and the lower side of the frame.

11. The display device according to claim 10, further comprising:

a first adhesive member, disposed between the display panel and the plate and coupled both to the display panel and to the plate;

a second adhesive member, disposed between the plate and the frame and coupled both to the plate and to the frame; and a third adhesive member, disposed between the lower side of the plate and the lower side of the frame and coupled both to the S-PCB and to the frame, wherein a sum of thicknesses of the first adhesive member, the plate and the second adhesive member is equal to a sum of thicknesses of the S-PCB and the third adhesive member.

* * * * *